United States Patent
Sievers et al.

(10) Patent No.: US 11,536,910 B2
(45) Date of Patent: Dec. 27, 2022

(54) OPTICAL FIBER CABLE ASSEMBLY FOR MONITORING FUNCTIONS

(71) Applicant: COMMSCOPE TECHNOLOGIES LLC, Hickory, NC (US)

(72) Inventors: Scott C. Sievers, Jordan, MN (US); Jill Anne Malecha, Bloomington, MN (US); Kristofer Bolster, Jordan, MN (US); Paula Lockhart, New Prague, MN (US)

(73) Assignee: CommScope Technologies LLC, Hickory, NC (US)

( * ) Notice: Subject to any disclaimer, the term of this patent is extended or adjusted under 35 U.S.C. 154(b) by 60 days.

(21) Appl. No.: 17/268,000

(22) PCT Filed: Aug. 14, 2019

(86) PCT No.: PCT/US2019/046494
§ 371 (c)(1),
(2) Date: Feb. 11, 2021

(87) PCT Pub. No.: WO2020/037036
PCT Pub. Date: Feb. 20, 2020

(65) Prior Publication Data
US 2021/0318491 A1 Oct. 14, 2021

Related U.S. Application Data (60) Provisional application No. 62/718,466, filed on Aug. 14, 2018, provisional application No. 62/811,786, (Continued)

(51) Int. Cl.
*G02B 6/255* (2006.01)
*G02B 6/36* (2006.01)
(Continued)

(52) U.S. Cl.
CPC .......... *G02B 6/3608* (2013.01); *G02B 6/255* (2013.01); *G02B 6/2804* (2013.01);
(Continued)

(58) Field of Classification Search
CPC .... G02B 6/255; G02B 6/2804; G02B 6/3608; G02B 6/3612; G02B 6/3897; G02B 6/4442; G02B 6/4471; G02B 6/4475
See application file for complete search history.

(56) References Cited

U.S. PATENT DOCUMENTS

| 5,204,925 A | * | 4/1993 | Bonanni | G02B 6/2804 |
| | | | | 385/76 |
| 5,943,455 A | * | 8/1999 | Travieso | G02B 6/30 |
| | | | | 385/24 |

(Continued)

FOREIGN PATENT DOCUMENTS

| WO | 2013/039788 A2 | 3/2013 |
| WO | 2013/039790 A2 | 3/2013 |

(Continued)

OTHER PUBLICATIONS

International Search Report and Written Opinion of the International Searching Authority for International Patent Application No. PCT/US2019/046494 dated Dec. 3, 2019, 9 pages.

*Primary Examiner* — Ryan A Lepisto
(74) *Attorney, Agent, or Firm* — Merchant & Gould P.C.

(57) ABSTRACT

A cable assembly for optical monitoring is assembled by laying optical fibers into an adhesive layer on a substrate to form an optical circuit. First ends of the fibers are arranged in various groups and second ends of the fibers are arranged in various groups. Groups at a first end of the circuit are spliced to coupler input fibers and coupler output fibers. Groups at the second end of the circuit are terminated at one or more input connectors, one or more output connectors, and one or more monitoring connectors. Some cable assem-
(Continued)

blies monitor signals received at the input connectors. Other cable assemblies monitor signals received at both the input connectors and the output connectors.

15 Claims, 10 Drawing Sheets

Related U.S. Application Data filed on Feb. 28, 2019, provisional application No. 62/718,474, filed on Aug. 14, 2018.

(51) Int. Cl.
  *G02B 6/38* (2006.01)
  *G02B 6/44* (2006.01)
  *G02B 6/28* (2006.01)
(52) U.S. Cl.
  CPC ......... *G02B 6/3612* (2013.01); *G02B 6/3897* (2013.01); *G02B 6/4471* (2013.01); *G02B 6/4442* (2013.01)

(56) References Cited

U.S. PATENT DOCUMENTS

| | | | | |
|---|---|---|---|---|
| 6,005,991 A * | 12/1999 | Knasel | ................ | G02B 6/3897 385/14 |
| 6,434,313 B1 | 8/2002 | Clapp, Jr. et al. | | |
| 6,442,323 B1 * | 8/2002 | Sorosiak | ................ | G02B 6/43 385/63 |
| 6,539,160 B2 | 3/2003 | Battey et al. | | |
| 6,554,483 B1 * | 4/2003 | Sun | ................ | G02B 6/3608 385/71 |
| 6,619,853 B2 * | 9/2003 | Grois | ................ | G02B 6/43 385/59 |
| 6,668,124 B2 * | 12/2003 | Kondo | ................ | G02B 6/3608 385/134 |
| 6,668,129 B2 * | 12/2003 | Kondo | ................ | G02B 6/3807 385/137 |
| 6,690,862 B1 * | 2/2004 | Rietveld | ................ | G02B 6/43 385/24 |
| 6,697,560 B1 * | 2/2004 | Kondo | ................ | G02B 6/3608 385/137 |
| 6,721,042 B1 * | 4/2004 | Sun | ................ | G02B 6/3608 355/114 |
| 6,850,671 B2 * | 2/2005 | Carnevale | ................ | G02B 6/4472 385/115 |
| 6,909,833 B2 | 6/2005 | Henschel et al. | | |
| 7,092,592 B2 * | 8/2006 | Verhagen | ................ | G02B 6/3608 385/24 |
| 7,130,498 B2 * | 10/2006 | Meis | ................ | G02B 6/3608 398/43 |
| 9,223,094 B2 * | 12/2015 | Schneider | ................ | G02B 6/3608 |
| 9,229,172 B2 * | 1/2016 | Eberle, Jr. | ................ | G02B 6/3608 |
| 9,417,418 B2 | 8/2016 | Eberle, Jr. et al. | | |
| 9,423,570 B2 * | 8/2016 | Petersen | ................ | G02B 6/43 |
| 9,488,788 B2 | 11/2016 | Murray et al. | | |
| 9,494,763 B2 * | 11/2016 | Benner | ................ | G02B 6/3829 |
| 9,753,229 B2 | 9/2017 | Murray et al. | | |
| 9,829,667 B2 * | 11/2017 | White | ................ | G02B 6/406 |
| 9,897,767 B2 | 2/2018 | Murray et al. | | |
| 9,946,045 B2 * | 4/2018 | Kegerise | ................ | G02B 6/4471 |
| 10,031,295 B2 | 7/2018 | Eberle, Jr. et al. | | |
| 10,067,295 B2 | 9/2018 | Eberle, Jr. | | |
| 10,295,761 B2 | 5/2019 | Murray et al. | | |
| 10,379,311 B1 * | 8/2019 | Krywicki | ................ | G02B 6/4478 |
| 10,451,809 B2 | 10/2019 | Eberle, Jr. et al. | | |
| 10,459,160 B2 * | 10/2019 | Brusberg | ................ | G02B 6/122 |
| 10,620,382 B2 | 4/2020 | Eberle, Jr. | | |
| 10,620,392 B2 * | 4/2020 | Scherwin | ................ | G02B 6/4463 |
| 10,705,306 B2 * | 7/2020 | Geens | ................ | G02B 6/4455 |
| 10,732,356 B2 * | 8/2020 | Geens | ................ | G02B 6/3608 |
| 10,739,534 B2 | 8/2020 | Murray et al. | | |
| 10,754,096 B2 | 8/2020 | Murray et al. | | |
| 10,782,483 B2 | 9/2020 | Eberle, Jr. et al. | | |
| 11,409,068 B2 * | 8/2022 | Marcouiller | ......... | G02B 6/3684 |
| 2003/0179980 A1 * | 9/2003 | Baechtle | ............. | G02B 6/3608 385/14 |
| 2013/0064495 A1 | 3/2013 | Eberle, Jr. | | |
| 2013/0064506 A1 | 3/2013 | Eberle, Jr. et al. | | |
| 2015/0253514 A1 | 9/2015 | Murray et al. | | |
| 2015/0260927 A1 | 9/2015 | Murray et al. | | |
| 2016/0223751 A1 | 8/2016 | Eberle, Jr. | | |
| 2017/0045693 A1 * | 2/2017 | Hodge | ................ | G02B 6/3676 |
| 2017/0068053 A1 | 3/2017 | Eberle, Jr. et al. | | |
| 2017/0123175 A1 | 5/2017 | Van Baelen et al. | | |
| 2017/0131485 A1 | 5/2017 | Murray et al. | | |
| 2018/0156981 A1 | 6/2018 | Murray et al. | | |
| 2018/0224611 A1 | 8/2018 | Murray et al. | | |
| 2018/0348450 A1 | 12/2018 | Smith et al. | | |
| 2018/0372978 A1 | 12/2018 | Wentworth et al. | | |
| 2019/0018200 A1 | 1/2019 | Eberle, Jr. et al. | | |
| 2019/0094470 A1 | 3/2019 | Eberle, Jr. | | |
| 2019/0129100 A1 * | 5/2019 | Hsu | ................ | G02B 6/40 |
| 2019/0339465 A1 | 11/2019 | Murray et al. | | |
| 2020/0057226 A1 | 2/2020 | Sievers et al. | | |
| 2020/0116944 A1 | 4/2020 | Eberle, Jr. et al. | | |
| 2020/0249412 A1 | 8/2020 | Marcouiller et al. | | |
| 2020/0348471 A1 | 11/2020 | Murray et al. | | |
| 2020/0386949 A1 | 12/2020 | Eberle, Jr. | | |
| 2021/0229379 A1 * | 7/2021 | Zitsch | ................ | B29D 11/00663 |

FOREIGN PATENT DOCUMENTS

| | | |
|---|---|---|
| WO | 2014/052441 A1 | 4/2014 |
| WO | 2014/052446 A1 | 4/2014 |
| WO | 2019/070682 A1 | 4/2019 |
| WO | 2019/079419 A1 | 4/2019 |

\* cited by examiner

OPTICAL FIBER CABLE ASSEMBLY FOR MONITORING FUNCTIONS

CROSS-REFERENCE TO RELATED APPLICATIONS

This application is a National Stage Application of PCT/US2019/046494, filed on Aug. 14, 2019, which claims the benefit of U.S. Patent Application Ser. No. 62/718,474, filed on Aug. 14, 2018, and claims the benefit of U.S. Patent Application Ser. No. 62/718,466, filed on Aug. 14, 2018, and claims the benefit of U.S. Patent Application Ser. No. 62/811,786, filed on Feb. 28, 2019, the disclosures of which are incorporated herein by reference in their entireties. To the extent appropriate, a claim of priority is made to each of the above disclosed applications.

BACKGROUND

In optical fiber networks, optical signals are transmitted along optical fibers. To monitor the signal level or the conditions of the transmission, a small amount of light can be tapped from the main lines. For example, tapping can be achieved by inserting an optical coating film in the main optical path. The coating film will reflect a small amount of the light being transmitted in the main path, while leaving most of the light transmitted in the main path for communication purposes. This small amount of light that is reflected by the optical coating film is then collected and analyzed in order to monitor the signal level or the conditions of transmission of the optical communication line. Alternatively, optical couplers/splitters can be used to separate out optical signals to be monitored from the optical signals used for communication purposes. Optical couplers/splitters not only split off a portion of optical signals from a main line, but also can add optical signals to the main line.

Improvements are desired.

SUMMARY

An optical cable assembly optically couples at least one input line to at least one output line and to at least one monitoring line. The power of the optical signals received at the input line is split between the output line and the monitoring line.

In some implementations, the optical cable assembly supports monitoring of optical signals received at the input lines. In such implementations, the optical cable assembly optically couples a plurality of input lines to a corresponding number of output lines and a corresponding number of monitoring lines. In other implementations, the optical cable assembly supports monitoring of optical signals received at both the input lines and the output lines. In such implementations, the optical cable assembly optically couples a plurality of input lines to a corresponding number of output lines and a double the number of monitoring lines.

In accordance with some aspects of the disclosure, the optical cable assembly includes an optical circuit that is spliced (e.g., mass fusion spliced) to an optical coupler arrangement. The optical circuit includes optical fibers extending between first and second ends. First ends of the optical fibers are spliced to coupler input fibers and coupler output fibers. Second ends of the optical fibers are terminated at one or more input connectors, one or more output connectors, and one or more monitoring connectors. The optical circuit routes the optical fibers to optically couple the input connector(s) to the coupler input fibers and to optically couple the output connector(s) and the monitoring connector(s) to the coupler output fibers.

In accordance with certain aspects of the disclosure, the optical circuit can be manufactured on one or more flex foil substrates, which is/are removed before using the optical cable assembly.

In accordance with certain aspects of the disclosure, ends of the optical fibers of the optical circuit can be ribbonized into groups before splicing to the coupler arrangement and before terminating to optical connectors. In certain implementations, the ends can be ribbonized into groups before removing the substrate(s).

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE FIGURES

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to an optical cable assembly suitable for optical monitoring. The cable assembly includes optical circuit having various first ends optically coupled (e.g., spliced) to optical couplers and having various second ends terminated at optical connectors.

In certain examples, the optical circuit is assembled by laying optical fibers into an adhesive layer on a substrate. First ends of the fibers of the optical circuit are arranged in various groups and second ends of the fibers are arranged in various groups. Groups at a first end of the optical circuit are spliced to coupler input fibers and coupler output fibers. Groups at the second end of the optical circuit are terminated at one or more input connectors, one or more output connectors, and one or more monitoring connectors. Some cable assemblies monitor signals received at the input connectors. Other cable assemblies monitor signals received at both the input connectors and the output connectors.

An optical cable assembly 100, 150 optically couples at least one input line to at least one output line and to at least one monitoring line. The power of the optical signals received at the input line is split between the output line and the monitoring line. In certain implementations, the optical cable assembly 100, 150 optically couples a plurality of input lines to a corresponding number of output lines and a plurality of monitoring lines. For example, the optical cable assembly 100, 150 may optically couple together one or more input connectors 133, 183, one or more output connectors 136, 186, and one or more monitoring connectors 137, 187, 188.

In certain implementations, the optical cable assembly 100, 150 can be used for functions other than monitoring (e.g., redundancy). For example, the monitoring connector(s) can be used as redundant output and/or redundant input lines.

The terms "input" and "output" are not intended to be limiting. Optical signals can travel in both directions between the input line and the output line.

Figure 15:
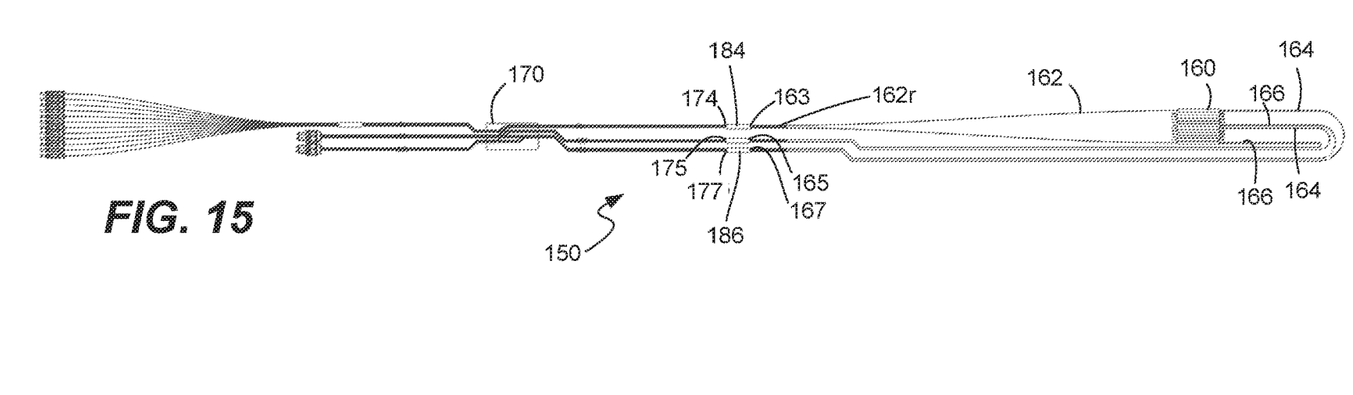
FIG. 15 is a plan view of the third example cable assembly having unidirectional couplers including the optical circuit of FIG. 12 spliced to the optical coupler arrangement of FIG. 13.
Figure 16:
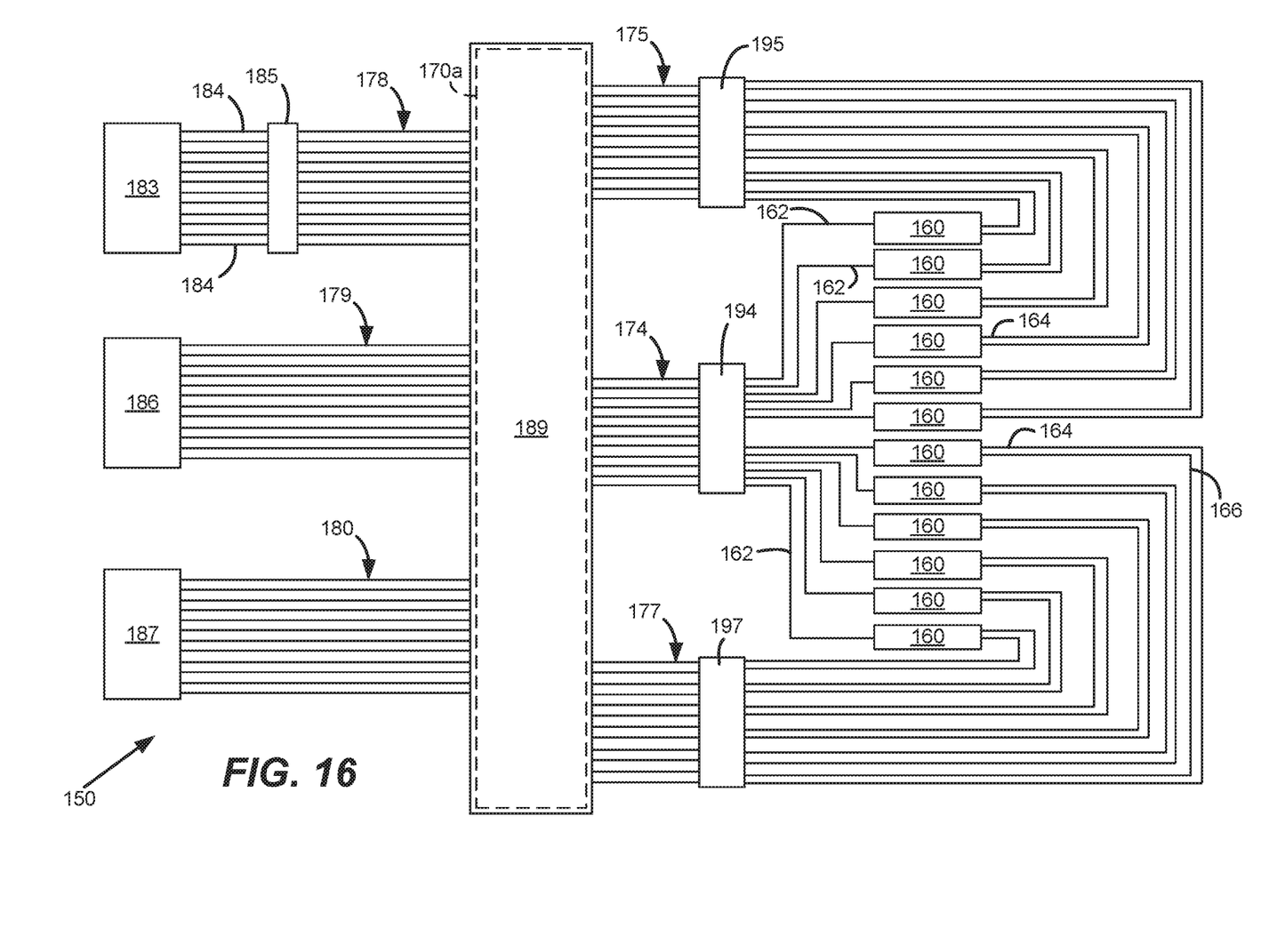
FIG. 16 is a schematic diagram of the fourth example cable assembly including the optical circuit of FIG. 9 terminated at optical connectors and spliced to unidirectional couplers.

In some implementations, the optical cable assembly 150 is unidirectional. In such implementations, the optical cable assembly 150 includes the same number of monitoring lines as the number of input lines. The optical signals traveling from the input connector 133, 183 to the output connector 136, 186 are monitored. Example unidirectional optical cable assemblies 150 are shown in FIGS. 9-16. A third cable assembly is shown in FIG. 15 and a fourth cable assembly is shown in FIG. 16. The third and fourth cable assemblies differ in the routing of the fibers within the optical circuit 170 to accommodate a difference in routing of one of the coupler output fiber groups (compare FIGS. 15 and 16).

Figures 5, 6, 7:
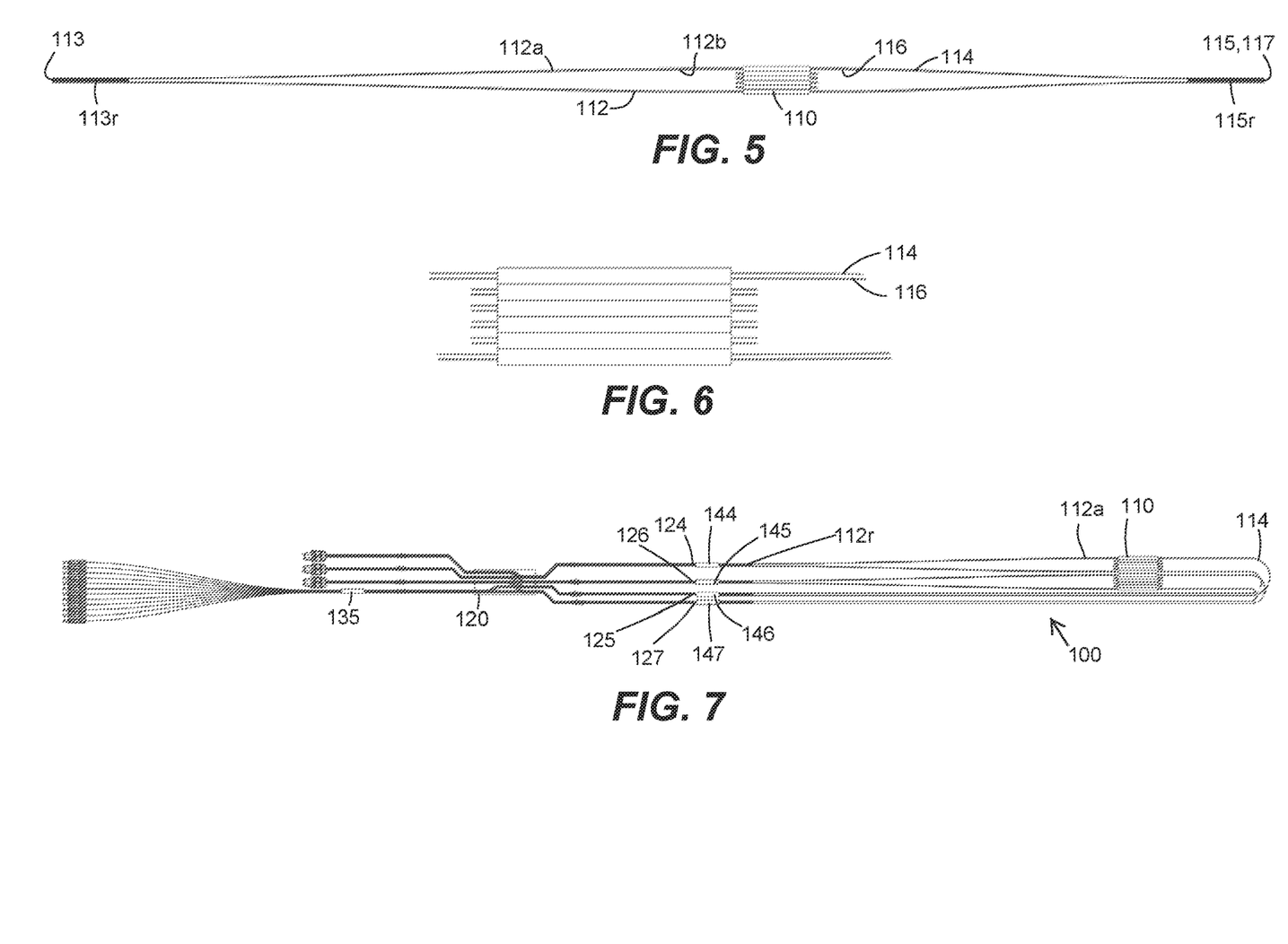
FIG. 5 is a schematic diagram of an optical coupler arrangement including optical couplers each having two coupler input fibers and two coupler output fibers, the input fibers of the optical coupler arrangement being ribbonized together and the output fibers of the optical coupler arrangement being ribbonized together.
FIG. 6 is an enlarged view of a portion of FIG. 5.
FIG. 7 is a plan view of the second example cable assembly having bidirectional couplers including the optical circuit of FIG. 4 spliced to two of the optical coupler arrangement of FIG. 5.
Figure 8:
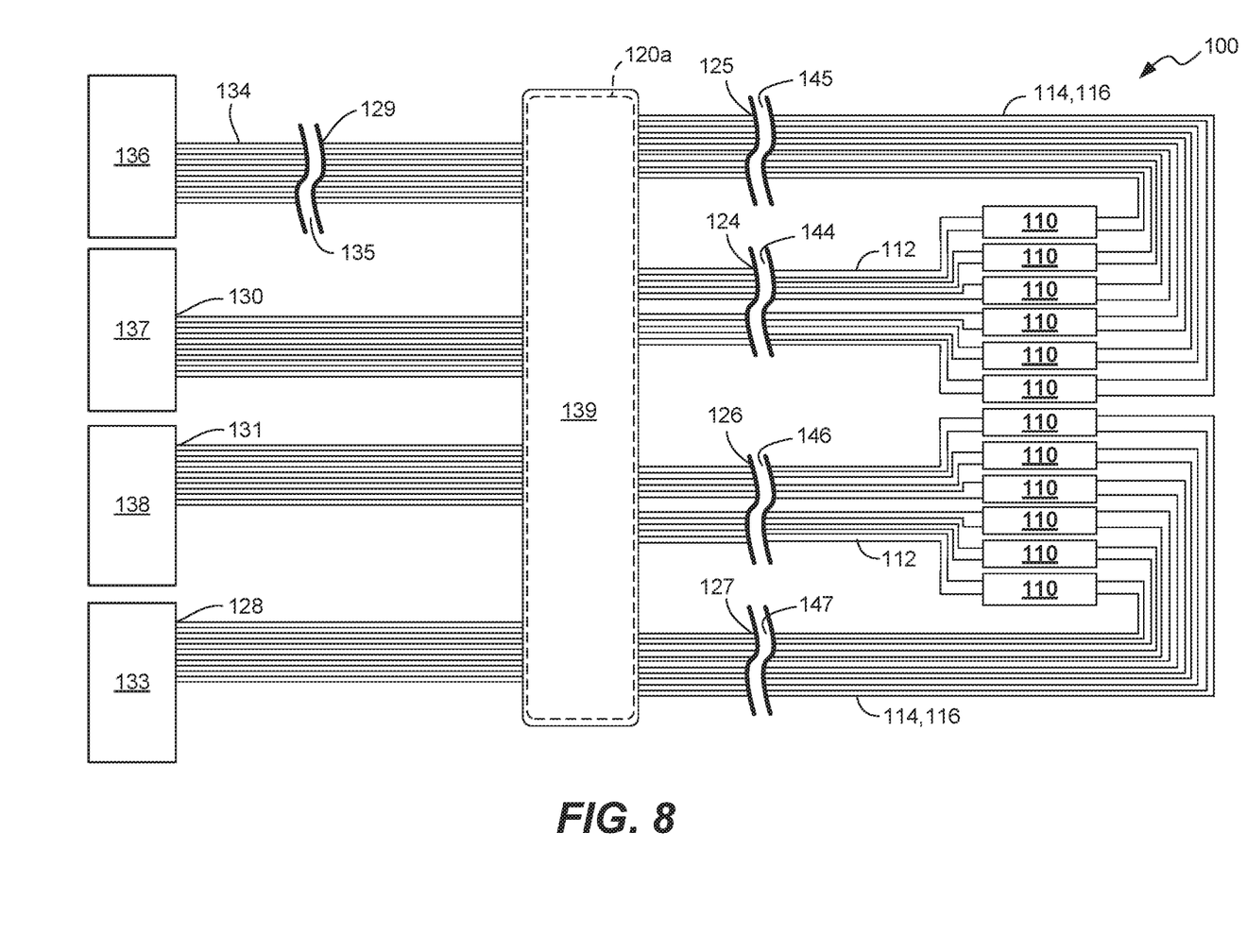
FIG. 8 is a schematic diagram of the first example cable assembly including the optical circuit of FIG. 1 terminated at optical connectors and spliced to bidirectional couplers.

In other implementations, the optical cable assembly 100 is a bidirectional. In such implementations, the optical cable assembly 100 includes the monitoring lines corresponding to the input lines and additional monitoring lines corresponding to the output lines. The additional monitoring lines monitor optical signals traveling from the output connector 136 to the input connector 133. Example bidirectional optical cable assemblies 100 are shown in FIGS. 1-8. A first cable assembly is shown in FIG. 8 and a second cable assembly is shown in FIG. 7. The first and second cable assemblies differ in the routing of the fibers within the optical circuit 120 to accommodate a difference in routing of one of the coupler output fiber groups (compare FIGS. 7 and 8). For example, the first and second cable assemblies may differ in routing of the optical fiber lines between the optical couplers 110, 160 and an optical circuit 120.

In certain implementations, the input lines, output lines, and monitoring lines (referred to herein as "optical lines") are terminated at optical connectors. In some implementations, each optical line can be terminated by a single-fiber optical connector (e.g., an LC plug connector, an SC plug connector, an LX.5 plug connector, etc.). In other implementations, two or more optical lines can be terminated at a multi-fiber connector (e.g., an MPO connector, an HMFOC connector, etc.).

In the examples shown, the input lines are each terminated by single-fiber connectors 133, 173 and the output lines are terminated by a single multi-fiber connector 136, 186. In a unidirectional cable assembly 150, the monitoring lines are terminated by one multi-fiber connector 137, 187. In a bidirectional cable assembly 100, the monitoring lines corresponding to the input lines are terminated by a first multi-fiber connector 137, 187 and the monitoring lines corresponding to the output lines are terminated by a second multi-fiber connector 138, 188.

In other implementations, however, the input lines can be terminated by a single multi-fiber connector, the output lines can be separately terminated by single-fiber connectors, and/or the monitoring lines can be separately terminated by single-fiber connectors.

The optical cable assembly 100, 150 includes an optical coupler 110, 160 for each input line. Each optical coupler 110, 160 has a coupler input 112, 162, a first coupler output 114, 164, and a second coupler output 116, 166. Each optical coupler 110, 160 splits (e.g., power splits) optical signals carried over the coupler input 112, 162 into split optical signals carried over the first and second coupler outputs 114, 164, 116, 166. The coupler input 112, 162 is optically coupled to the input line, the first coupler output 114, 164 is optically coupled to the output line, and the second coupler output 116, 164 is optically coupled to the monitoring line.

In a bidirectional cable assembly 100, each optical coupler 110 includes two input lines 112a, 112b. Each optical coupler 110 splits (e.g., power splits) optical signals carried over the first coupler input 112a into split optical signals carried over the first and second coupler outputs 114, 116. Each optical coupler 110 also power splits optical signals carried over the first output 114 into split optical signals carried over the first and second input lines 112*a*, 112*b*. The first input lines 112*a* are optically coupled to the input lines for the cable assembly 100. The second input lines 112*b* are optically coupled to the additional monitoring lines of the cable assembly 100.

In some examples, each optical coupler 110, 160 power splits the optical signals in a 50/50 ratio. In other examples, each optical coupler 110, 160 power splits the optical signals in an uneven ratio (e.g., 60/40, 70/30, 75/25, 80/20, 90/10, 95/5, etc.). Typically, in such examples, the smaller amount of power is directed to the corresponding monitoring lines. In other examples, different optical couplers 110, 160 within a cable assembly 100, 150 split the optical signals along different ratios. In other implementations, each optical coupler splits the optical signals by wavelength instead of by power.

The optical cable assembly 100, 150 can be efficiently assembled by manufacturing an optical circuit 120, 170 including a plurality of optical fibers 121, 171 extending between first ends 122, 172, and second ends 123, 173. The optical circuit 120, 170 separates the unterminated ends 122, 123, 172, 173 of the optical fibers 121, 171 into groups. In some examples, each group of unterminated ends can then be efficiently optically coupled (e.g., fusion spliced) to input lines, output lines, monitoring lines, coupler input lines 112, 162, and/or coupler output lines 114, 116, 164, 166. In other examples, one or more of the groups may form the input lines, the output lines, and/or the monitoring lines.

The optical circuit 120, 170 can be initially assembled by laying the optical fibers 121, 171 over one or more substrates 139, 189. Adhesive or other bonding material holds the optical fibers 121, 171 in position once laid on the substrate 139, 189. Assembling the optical circuit 120, 170 on the substrate(s) 139, 189 allows complex fiber routing (e.g., fiber cross-overs) to be completed easily and efficiently. In certain implementations, a conformal coating 139*am* 189*a* may be laid over the optical fibers on one or more of the substrates 139, 189.

In certain implementations, the substrate 139, 189 includes a flexible foil. In certain implementations, the substrate has an adhesive side and a non-adhesive side. The fibers are laid on the adhesive side. In certain implementations, the substrate 139, 189 includes polyethylene terephthalate (PET). However, it should be understood that PET is simply one non-limiting example polymer that may be used to form the flexible foil of the present disclosure, and other polymers having similar characteristics and that are able to at least semi-rigidly support the fibers in a predetermined orientation are also usable in accordance with the inventive concepts of the present disclosure.

Figure 1:
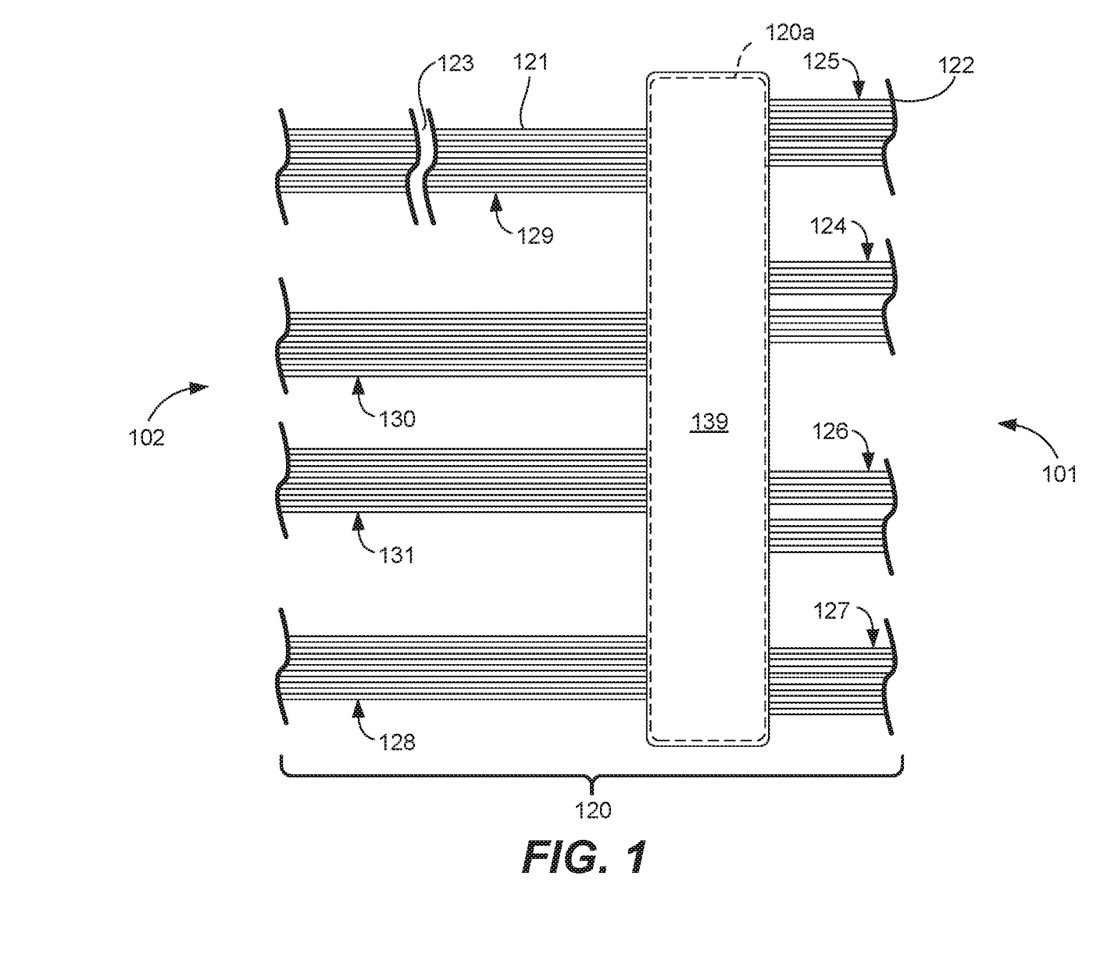
FIG. 1 is a schematic diagram of a first example optical circuit including optical fibers with ribbonized groups of first fiber ends at a first end of the optical circuit and ribbonized groups of second fiber ends at a second end of the optical circuit, the optical circuit being suitable for use in the first example cable assembly having bidirectional couplers shown in FIG. 8.
Figure 2:
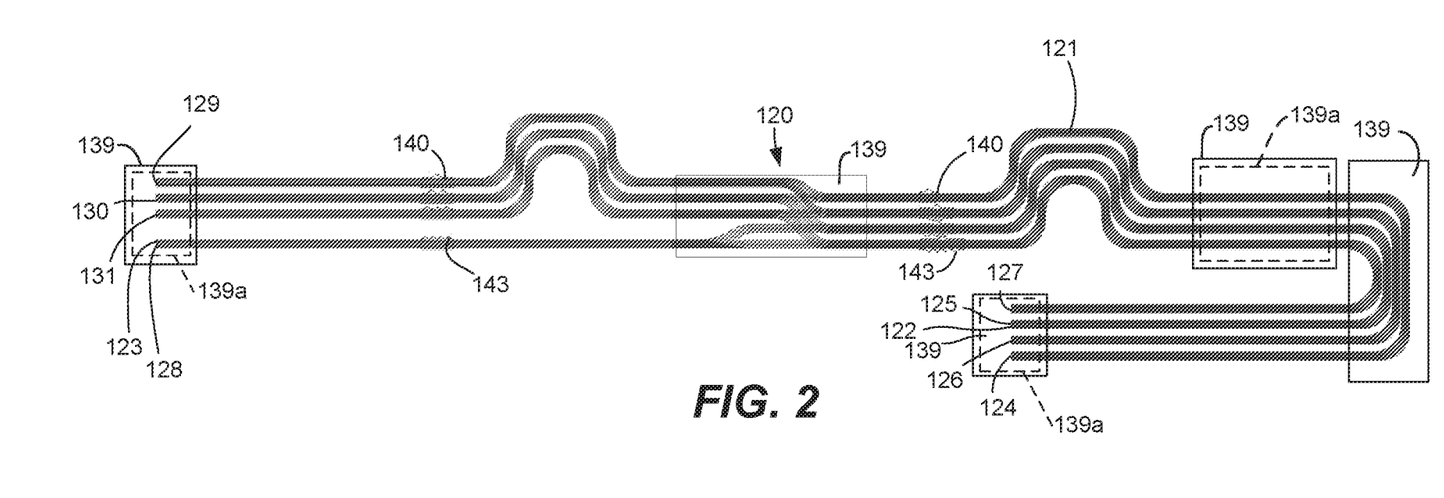
FIG. 2 is a plan view of an example optical circuit suitable for use in a second example cable assembly with bidirectional couplers shown in FIG. 7, the optical circuit of FIG. 2 including optical fibers adhesively arranged on one or more substrates to retain the optical fibers in position.
Figure 3:
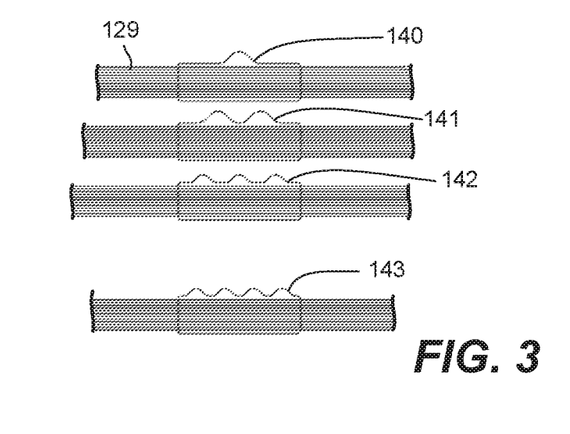
FIG. 3 is an enlarged view of a portion of FIG. 2.
Figure 4:
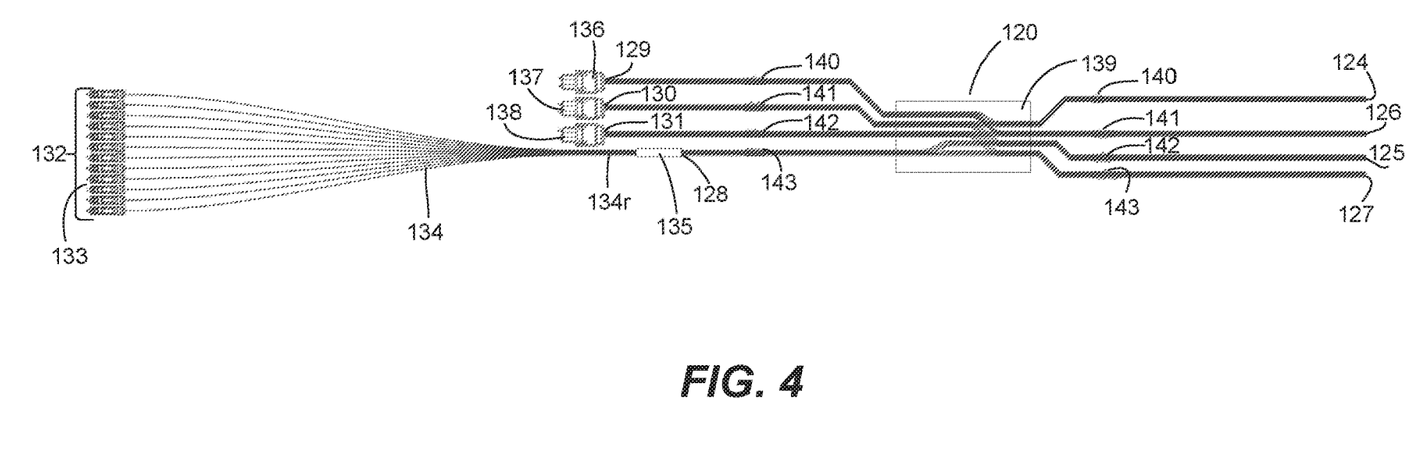
FIG. 4 is a plan view of the example optical circuit of FIG. 2 having optical connectors terminating the ribbonized groups at the second end of the optical circuit.
Figure 10:
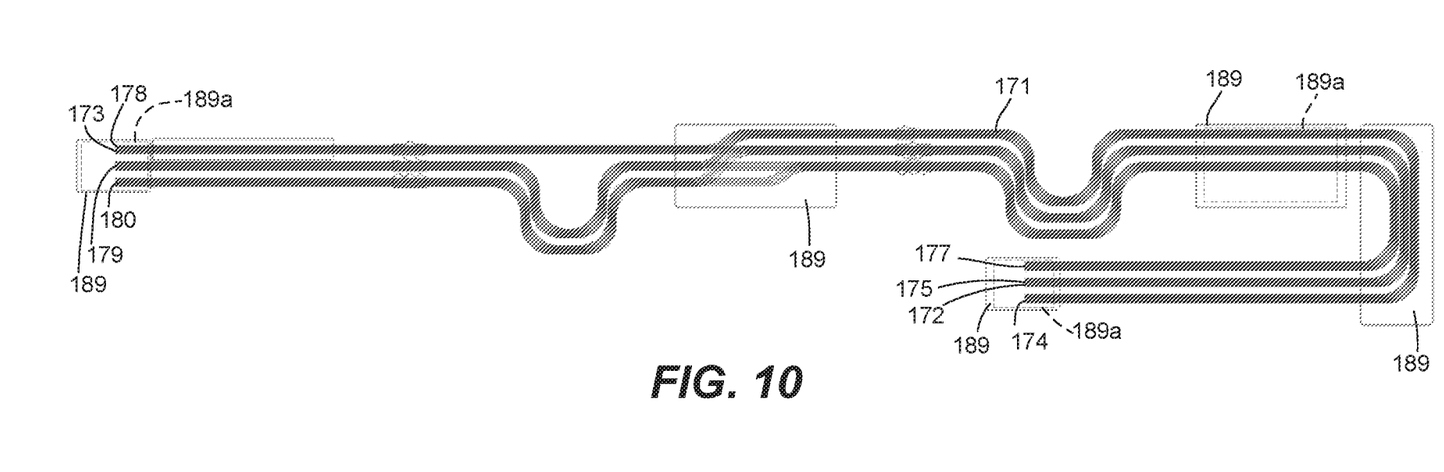
FIG. 10 is a plan view of an example optical circuit suitable for use in a third example cable assembly with unidirectional couplers shown in FIG. 15, the example optical circuit of FIG. 10 including optical fibers adhesively arranged on one or more substrates to retain the optical fibers in position.
Figure 11:
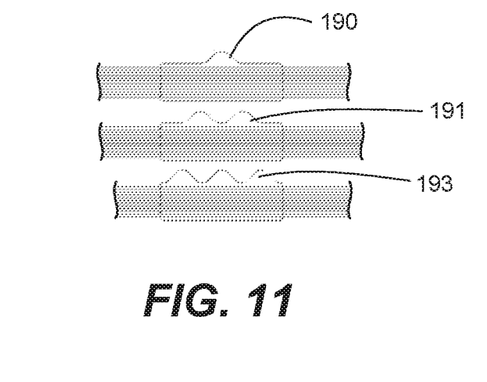
FIG. 11 is an enlarged view of a portion of FIG. 10.
Figure 12:
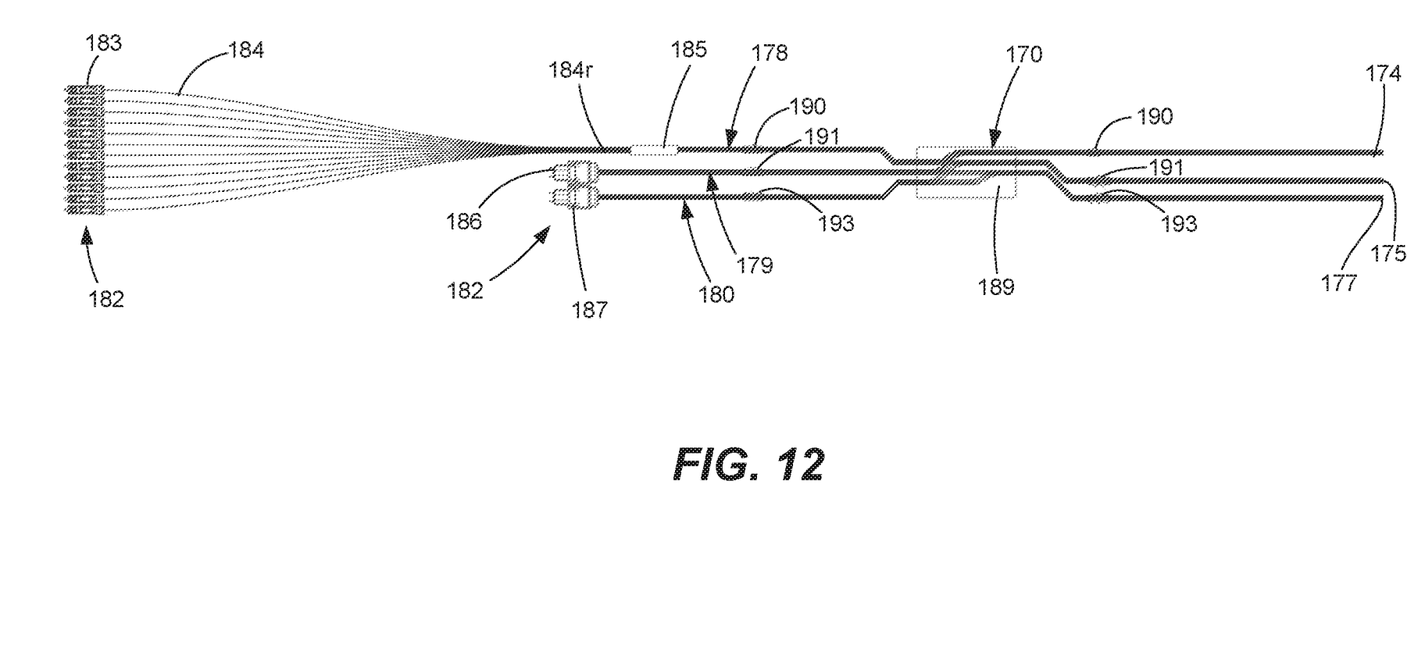
FIG. 12 is a plan view of the third example optical circuit of FIG. 10 having optical connectors terminating the ribbonized groups at the second end of the optical circuit.
Figures 13, 14:
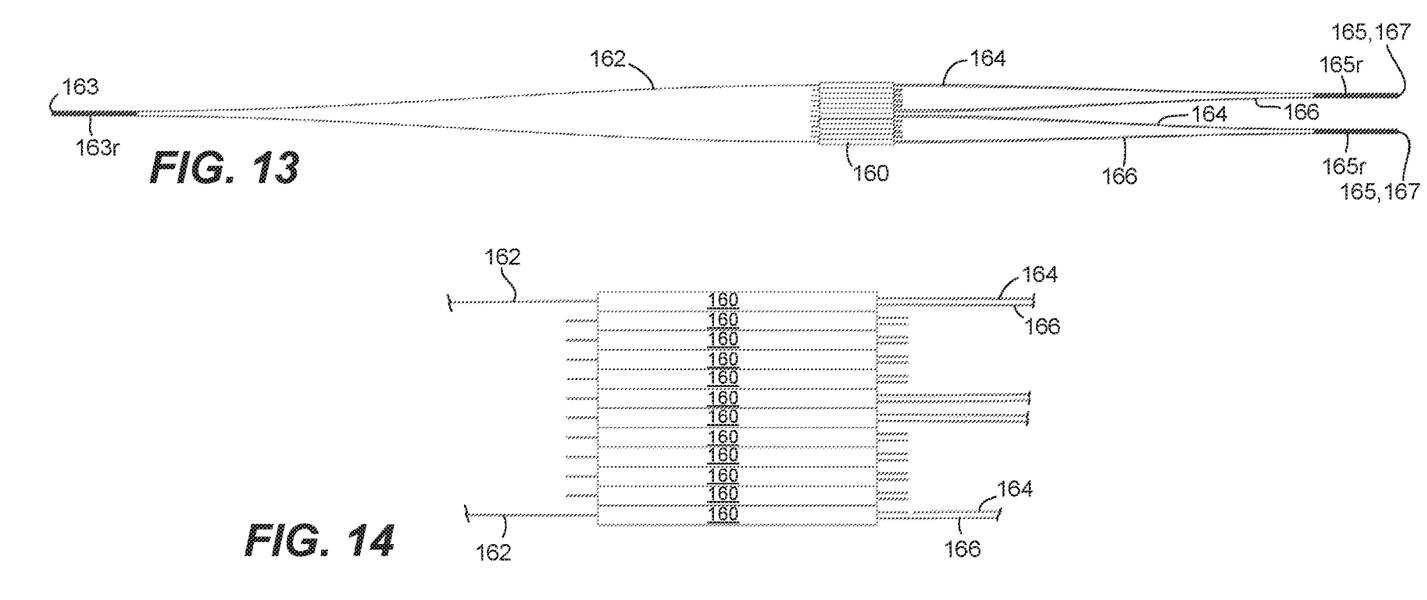
FIG. 13 is a schematic diagram of an optical coupler arrangement including optical couplers each having one coupler input fiber and two coupler output fibers, the input fibers of the optical coupler arrangement being ribbonized together and the output fibers of the optical coupler arrangement being ribbonized together.
FIG. 14 is an enlarged view of a portion of FIG. 13.

In the example shown in FIGS. 2 and 10, the optical circuit 120, 170 is assembled over five substrates. The first ends 122, 172 of the fibers 121, 171 of the optical circuit 120, 170 are disposed at a first substrate 139, 189 and the second ends 123, 173 of the fibers 121, 171 are disposed at a second substrate 139, 189. In certain examples, a conformal coating 139*a*, 189*a* is laid over the fibers 121, 171 to ribbonize the fibers 121, 171 or otherwise hold the fibers in position even after the substrate 139, 189 is removed.

An intermediate portion of the fibers 121, 171 is laid over a third substrate 139, 189. Cross-overs or other complex routing of the optical fibers 121, 171 is performed over this substrate 139, 189. Reference numbers 120*a*, 170*a* refer to the complex routing section of the fibers 121, 171. To enhance clarity, the complex routing is shown as a dashed box. The adhesive on the substrate 139, 189 holds the fibers 121, 171 in position. In certain examples, no further coating is layered over the fibers 121, 171. Accordingly, removing this substrate 139, 189 from the fibers 121, 171 results in loose fibers 121, 171. Leaving this section of the fibers 121, 171 loose facilitates routing of the fibers within a cassette or other component.

In certain implementations, a portion of the fibers 121, 171 to be cut is laid over a fourth substrate 139, 189. In certain examples, a conformal coating 139*a*, 189*a* is laid over the fibers 121, 171 at the fourth substrate to ribbonize the fibers 121, 171 or otherwise hold the fibers in position even after the substrate 139, 189 is removed.

In certain implementations, the optical circuit 120, 170 is tested prior to being terminated and/or spliced to optical couplers 110, 160 or other optical components. For example, the first ends 122, 172 of the optical fibers 121, 171 may be coupled to testing equipment. In certain examples, the first substrate 139, 189 is removed from the first ends 122, 172 of the fibers 121, 171 during testing. A conformal coating 139*a*, 189*a* laid over the fibers at the first substrate 139, 189 holds the fibers in position during testing.

When the testing is complete, the optical fibers 121, 171 may be cut (e.g., at the fourth substrate) to create new first ends 122, 172 of the optical fibers 121, 171. These new first ends 122, 172 may be optically coupled to the optical couplers 110, 160 as will be described below after the fourth substrate 139, 189 is removed. The conformal coating 139*a*, 189*a* at the fourth substrate may hold the new first ends 122, 172 of the optical fibers 121, 171 in their groups.

In other implementations, flexible optical circuits essentially comprise one or more fibers sandwiched between two flexible sheets of material, such as Mylar™ or another polymer. An epoxy may be included between the two sheets in order to adhere them together. Alternatively, depending on the sheet material and other factors, the two sheets may be heated above their melting point to heat-weld them together with the fibers embedded between the two sheets.

Additional details regarding the formation of the optical circuit can be found in U.S. Provisional Application No. 62/566,906, filed Oct. 2, 2017, titled "Fiber Optic Circuit and Preparation Method," the disclosure of which is hereby incorporated herein by reference.

The optical circuit 120, 170 separates the unterminated first ends 122, 172 of the optical fibers 121, 171 into at least a first group 124, 126, 174 and a second group 125, 127, 175, 177. Each group of first ends 122, 172 is spaced from the other groups of first ends 122, 172, thereby enhancing the ease of identifying the ends. In certain examples, the adhesive or other bonding material holds the unterminated ends 122, 172 in a row or other configuration to facilitate the optical coupling process (e.g., a mass fusion splice).

Figure 9:
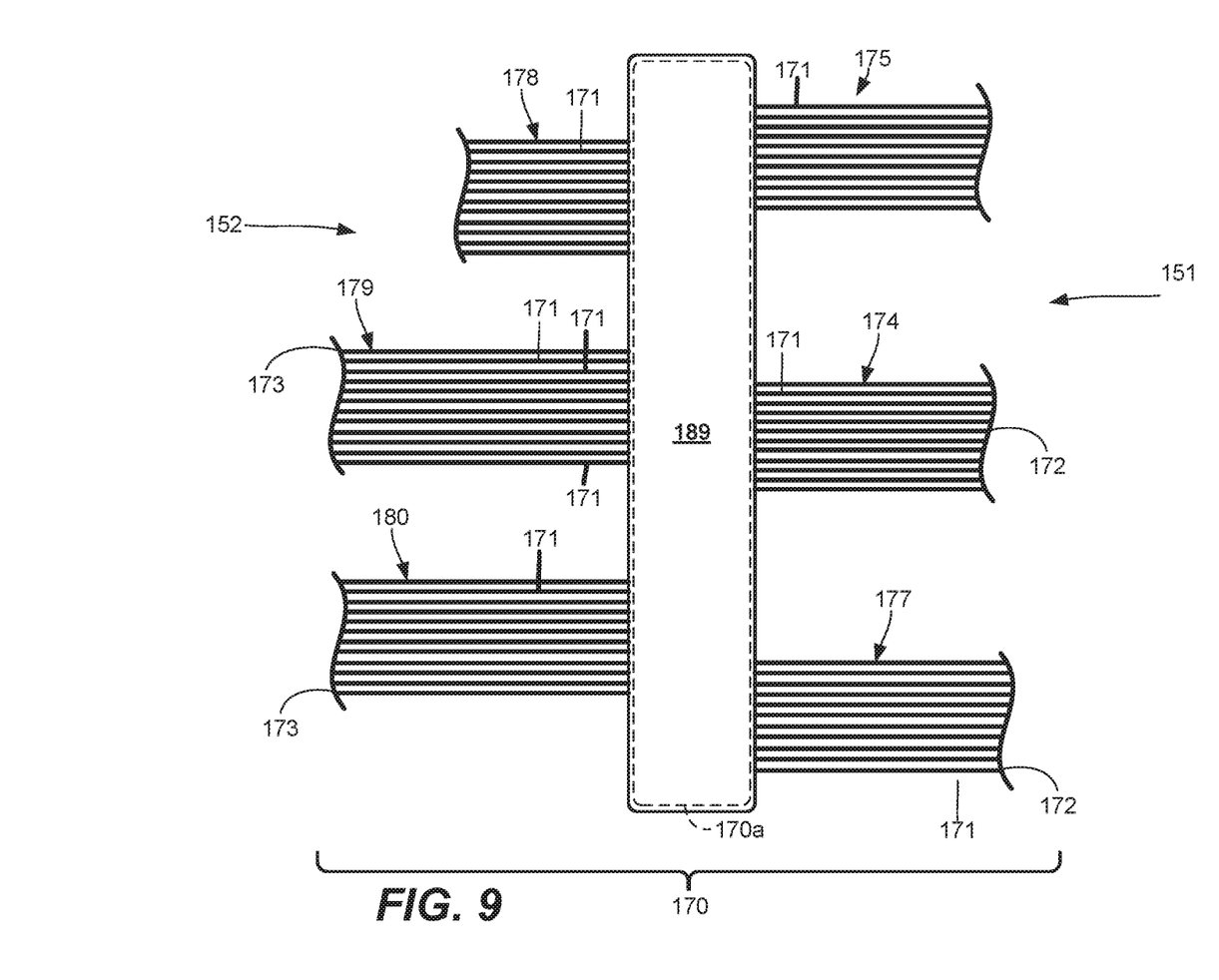
FIG. 9 is a schematic diagram of an example optical circuit including optical fibers with ribbonized groups of first fiber ends at a first end of the optical circuit and ribbonized groups of second fiber ends at a second end of the optical circuit, the optical circuit of FIG. 9 being suitable for use in the fourth example cable assembly having unidirectional couplers shown in FIG. 16.

In some examples, such as the unidirectional optical cable assembly 150 shown in FIG. 9, the optical circuit 170 separates the unterminated first ends 172 into the first group 174, the second group 175, and another second group 177. In other examples, such as the bidirectional optical cable assembly 100 shown in FIG. 1, the optical circuit 120 separates the unterminated first ends 122 into a first group 124, a second group 125, another first group 126, and another second group 127.

The optical circuit 120, 170 also separates the unterminated second ends 123, 173 of the optical fibers 121, 171 into another plurality of groups including a third group 128, 178, a fourth group 129, 179, and a fifth group 130, 180. In certain examples, the optical circuit 120 may separate the unterminated second ends 123 of the optical fibers 121 into the third group 128, the fourth group 129, the fifth group 130, and a sixth group 131. Each group of second ends 123, 173 is spaced from the other groups of second ends 123, 173, thereby enhancing the ease of identifying the ends. In certain examples, the adhesive or other bonding material holds the unterminated ends 123, 173 in a row or other configuration to facilitate the optical coupling process (e.g., a mass fusion splice).

In some implementations, the first ends 122, 172 of the optical fibers 121, 171 are disposed at a first end 101, 151 of the optical circuit 120, 170 and the second ends 123, 173 are disposed at a second end 102, 152 of the optical circuit 120, 170. In certain implementations, the first end 101, 151 faces in an opposite direction from the second end 102, 152. In some implementations, the number of fiber groups formed at the first end 101, 151 matches the number of fiber groups formed at the second end 102, 152. It is noted that the group numbers provided herein are not intended to indicate placement on the optical circuit. For example, the third, fourth, and fifth groups need not be arranged in sequence. Rather, the third group may be disposed between the fourth and fifth group (e.g., see FIG. 1).

The optical circuit 120, 170 also includes the fiber routing between the groups 124, 125, 126, 127, 174, 175, 177 of first ends 122, 172 and the groups 128-131, 178-181 of second ends 123, 173. The fibers 121, 171 in the optical circuit 120, 170 do not merely extend in rows between the first and second ends. Rather, the optical circuit 120, 170 includes any fiber crossovers and/or regroupings occurring between the first end 101, 151 and the second end 102, 152 of the optical circuit 120, 170. In certain examples, the fiber crossovers and/or regroupings occur over a predetermined length at an intermediate portion of the optical circuit 120, 170. In certain examples, the predetermined length extends over less than a majority of a length of the optical circuit 120, 170. In certain examples, the predetermined length extends over significantly less than a majority of a length of the optical circuit 120, 170.

The optical cable assembly 100, 150 is further assembled by optically coupling (e.g., splicing) the optical couplers 110, 160 to the optical circuit 120, 170. For example, the first group 124, 174 of the unterminated first ends 122, 172 is spliced to free ends 113, 163 of at least some of the coupler input fibers 112, 162.

In the unidirectional cable assembly 150 of FIGS. 9-16, a first group 174 of the unterminated first ends 162 are spliced (e.g., at an optical splice 194) to the free ends 163 of all of the coupler input fibers 162. In the bidirectional cable assembly 100 of FIGS. 1-8, a first group 124 of the unterminated first ends 122 are spliced (e.g., at an optical splice 144) to the free ends 113 of some of the coupler input fibers 112, 112a, 112b and another first group 126 of the unterminated first ends 122 are spliced (e.g., at an optical splice 145) to the free ends 113 of others of the coupler input fibers 112, 112a, 112b. In an example, the first group 124 is spliced to the coupler input fibers 112, 112a, 112b of a first plurality of the couplers 110 and the other first group 126 is spliced to the coupler input fibers 112, 112a, 112b of a second plurality of the couplers 110.

The second group 125, 175 of unterminated first ends 122, 172 is spliced to free ends 115, 165 of some of the coupler output fibers 114, 116, 164, 166. Another second group 127, 177 of unterminated first ends 122, 172 is spliced to free ends 117, 167 of others of the coupler output fibers 114, 116, 164, 166. In an example, the second group 125, 175 is spliced to the coupler output fibers 114, 116, 164, 166 of a first plurality of the couplers 110 and the other second group 127, 177 is spliced to the coupler output fibers 114, 116, 164, 166 of a second plurality of the couplers 110.

In certain implementations, the free ends 113, 163 of the coupler input fibers 112, 112a, 112b, 162 are ribbonized (e.g., bound into a row or matrix using adhesive) before being optically coupled to the first and optionally fourth groups 124, 174, 126. The ribbonized section 113r, 163r of the free ends 113, 163 can then be spliced (e.g., with a mass fusion splice) to the first groups 124, 174, 126. In certain implementations, the free ends 115, 117, 165, 167 of the coupler output fibers 114, 116, 164, 166 are ribbonized before being optically coupled to the second groups 125, 127, 175, 177. The ribbonized section 115r, 165r of the free ends 115, 117, 165, 167 can then be spliced (e.g., with a mass fusion splice) to the second groups 125, 127, 175, 177.

In other implementations, however, the optical circuit 120, 170 includes only two groups of unterminated first ends 122, 172. A first of the groups can be spliced to all coupler input fibers 112, 162 and a second of the groups can be spliced to all coupler output fibers 114, 116, 164, 166. In still other implementations, the optical circuit 120, 170 can include more than four groups of unterminated first ends 122, 172 that each can be spliced to the coupler input fibers 112, 162 and/or coupler output fibers 114, 116, 164, 166.

The optical cable assembly 100, 150 is further assembled by terminating the second ends 123, 173 of the optical fibers 121, 171 of the optical circuit 120, 170 at optical connectors (e.g., plug connectors). In some implementations, the second ends 123, 173 are directly terminated at the optical connectors. In other implementations, the second ends 123, 173 are optically coupled (e.g., spliced) to stub fibers extending outwardly from the optical connectors.

In the examples shown, the third group 128, 178 of the unterminated second ends 123, 173 of the optical fibers 121, 171 form or optically couple to the input lines for the cable assembly 100, 150; the fourth group 129, 179 of the unterminated second ends 123, 173 form or optically couple to the output lines; and the fifth group 130, 180 of the unterminated second ends 123, 173 form or optically couple to monitoring lines. In the unidirectional cable assembly 150, the fifth group 130, 180 forms or optically couples to all of the monitoring lines in the cable assembly 150. In the bidirectional cable assembly 100, the fifth group 130, 180 forms or optically couples to the monitoring lines monitoring optical signals received at the input lines and a sixth group 131 forms or optically couples to the monitoring lines monitoring optical signals received at the output lines.

The second ends 123, 173 of the optical fibers 121, 171 of the third group 128, 178 of the optical circuit 120, 170 are terminated to one or more input plug connectors 133, 183. Accordingly, the one or more input plug connectors 133, 183 are optically coupled to at least some of the coupler input fibers 112, 162. In the example shown, each second end 123, 173 is separately terminated to a single-fiber plug connector 133, 183 (e.g., an LC plug connector, an SC plug connector, etc.). In other examples, the second ends 123, 173 may be terminated together at one or more multi-fiber connectors instead.

In some examples, each of the second ends 123, 173 of the third group 128, 178 may be directly terminated at a single-fiber plug connector 133, 173. In other examples, the second ends 123, 173 of the third group 128, 178 may be spliced (at an optical splice 135, 185) to a plurality of stub fibers 134, 184 extending outwardly from the single-fiber plug connectors 133, 183. In an example, the stub fibers 134,

174 may be ribbonized 134r, 174r prior to being spliced (e.g., mass fusion spliced) to the second ends 123, 173 of the third group 128, 178.

The second ends 123, 173 of the optical fibers 121, 171 of the fourth group 129, 179 of the optical circuit 120, 170 are terminated to one or more output plug connectors 136, 186. Accordingly, the one or more output plug connectors 136, 186 are optically coupled to the first coupler output fibers 114, 164. In the example shown, the second ends 123, 173 of the fourth group 129, 179 are inserted into a multi-fiber plug connector (e.g., an MPO plug connector, etc.) 136, 186. In other examples, the second ends 123, 173 of the fourth group 129, 179 may be separately terminated at corresponding single-fiber connectors instead.

The second ends 123, 173 of the optical fibers 121, 171 of the fifth group 130, 180 of the optical circuit 120, 170 are terminated to one or more monitoring plug connectors 137, 187. Accordingly, the one or more monitoring plug connectors 137, 187 are optically coupled to the second coupler output fibers 116, 166. In the example shown, the second ends 123, 173 of the fifth group 130, 180 are inserted into a multi-fiber plug connector (e.g., an MPO plug connector, etc.) 137, 187. In other examples, the second ends 123, 173 of the fifth group 130, 180 may be separately terminated at corresponding single-fiber connectors instead.

In the bidirectional cable assembly 100, the second ends 123 of the optical fibers 121 of the sixth group 131 of the optical circuit 120 are terminated to one or more additional monitoring plug connectors 138. Accordingly, the one or more additional monitoring plug connectors 138 are optically coupled to the second coupler input fibers 112b while the input connectors 133, 183 are optically coupled to the first coupler input fibers 112a. In the example shown, the second ends 123 of the sixth group 131 are inserted into a multi-fiber plug connector (e.g., an MPO plug connector, etc.) 138. In other examples, the second ends 123 of the sixth group 131, 181 may be separately terminated at corresponding single-fiber connectors instead.

It is noted that the optical fibers 121, 171 of the fourth group 129, 179 of the optical circuit 120, 170 are optically coupled to the first coupler output fibers 114, 164, but not to the second coupler output fibers 116, 166. The optical fibers 121, 171 of the fifth group 130, 180 of the optical circuit 120, 170 are optically coupled to the second coupler output fibers 116, 166, but not to the first coupler output fibers 114, 164. However, each of the second groups 145, 147, 175, 177 of the optical circuit 120, 170 are optically coupled to both the first and second coupler output fibers 114, 116, 164, 166.

As shown in FIGS. 8 and 16, the optical circuit 120, 170 is assembled by laying at least sections of the fibers 121, 171 across one or more substrates 139, 189. For example, a majority of the crossovers between the fibers 121, 171 occurs on a main substrate 139, 189 at an intermediate position along a length of the fibers 121, 171. In some examples, the main substrate 139, 189 holds the entirety of the lengths of the optical fibers 121, 171. In other examples, portions of the fibers 121, 171 are laid on separate substrates. For example, the first ends 122, 172 of the fibers 121, 171 may be grouped along a second substrate 139, 189 and the second ends 123, 173 of the fibers 121, 171 may be grouped along a third substrate 139, 189.

The substrates 139, 189 are removed from the optical fibers 121, 171 before the optical cable assembly 100, 150 is utilized (e.g., routed within a cassette). In some examples, the substrates 139, 189 are removed after the splices 135, 144, 145, 146, 147, 185, 194, 195, 197 are formed. In other examples, the substrates 139, 189 are removed before the splices 135, 144, 145, 146, 147, 185, 194, 195, 197 are formed. In some examples, the substrates 139, 189 are removed after the second ends 123, 173 of the fibers 121, 171 are terminated at the plug connectors 133, 136, 137, 138, 183, 186, 187. In other examples, the substrates 139, 189 are removed before the second ends 123, 173 of the fibers 121, 171 are terminated at the plug connectors 133, 136, 137, 138, 183, 186, 187.

In some implementations, the substrates 139, 189 are removed by peeling the substrates 139, 189 from the fibers 121, 171. In other implementations, the substrates 139, 189 are removed by cutting the fibers 121, 171 so that the substrates 139, 189 are no longer connected to the optical circuit 120, 170. In certain implementations, the substrates 139, 189 at the fiber ends 122, 123, 172, 173 are removed by cutting while the main substrate 139, 189 is removed by peeling.

In certain implementations, portions of the optical fibers 121, 171 are ribbonized prior to removing the substrates 139, 189. For example, the first ends 122, 172 of the fibers 121, 171 in the first and second groups 124, 125, 126, 127, 174, 175, 177 may be ribbonized into the groups prior to cutting off the substrate 139, 189 retaining the second ends 123, 173. Accordingly, the fiber ends 122, 172 may be maintained in the respective groups 124, 125, 126, 127, 174, 175, 177 even after the substrates 139, 189 are removed. The second ends 123, 173 of the fibers 121, 171 in the third, fourth, fifth, and sixth groups 128, 129, 130, 131, 178, 179, 180 may be ribbonized into the groups prior to cutting of the substrate 139, 189 retaining the first ends 122, 172. Accordingly, the fiber ends 123, 173 may be maintained in the respective groups 128, 129, 130, 131, 178, 179, 180 even after the substrates 139, 189 are removed.

In certain implementations, indicators can be added to the fiber groups to identify each fiber group. Example indicators suitable for use with the optical circuit include a sleeve having tactile indicia, printed indicia, and/or color indicia to distinguish the indicator from the other indicators. In the example shown, each indicator includes tactile indicia in the form of bumps on an external surface of the sleeve. Each indicator disposed at a particular side of the optical circuit 120, 170 has a unique number of bumps (e.g., 1, 2, 3, 4, etc.). In other examples, the indicators may be different colors or have different labeling printed thereon.

A first indicator can be disposed at the optical fibers 121, 171 of the first group 124, 174; a second indicator can be disposed at the optical fibers 121, 171 of the second group 125, 175; a third indicator can be disposed at the optical fibers 121, 171 of the other second group 127, 177; and a fourth indicator can be disposed at the optical fibers 121 of the other first group 126. In certain examples, indicators also can be disposed at the fibers 121, 171 of the third, fourth, fifth, and sixth groups 128-131, 178-180.

In certain implementations, substrates are removed from the indicators prior to use of the cable assembly 100, 150. For example, the substrates of the indicators at the first and second groups 124, 126, 174 can be removed after being spliced to the appropriate optical coupler fibers. The substrates of the indicators at the third, fourth, fifth, and/or sixth groups 128, 178, 129, 179, 130, 180, 131 can be removed after the groups are terminated.

In some examples, the optical circuit 120, 170 has a like number of groups at the first end 101, 151 and the second end 102, 152. In such examples, the same indicator can be used at each end 101, 151, 102, 152. In the example shown in FIG. 4, four indicators 140-143 are used to designate the groups on each side of the circuit 120. A first indicator 140 designates the first group 124 at the first end 101 and the fourth group 129 at the second end 102; a second indicator 141 designates another of the first groups 126 at the first end 101 and the fifth group 130 at the second end 102; a third indicator 142 designates one of the second groups 125 at the first end 101 and the sixth group 131 at the second end 102; a fourth indicator 143 designates the other of the second groups 127 at the first end 101 and the third group 128 at the second end 102. In the example shown in FIG. 12, three indicators 190, 191, 193 are used to designate the groups on each side of the circuit 150. A first indicator 190 designates the first group 174 at the first end 151 and the third group 178 at the second end 152; a second indicator 191 designates one of the second groups 175 at the first end 151 and the fourth group 179 at the second end 152; and a third indicator 193 designates the other of the second groups 177 at the first end 151 and the fifth group 180 at the second end 152. In other examples, however, each indicator in the optical circuit 120, 170 could be unique.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. An optical cable assembly comprising:
   a plurality of optical couplers, each optical coupler having at least one coupler input fiber, a first coupler output fiber, and a second coupler output fiber;
   a plurality of optical fibers adhesively laid on a substrate to form an optical circuit, each optical fiber extending from an unterminated first end to an unterminated second end, the optical circuit separating the unterminated first ends of the optical fibers into a plurality of groups including a first group and a second group, the first group of the unterminated first ends being spliced to free ends of at least some of the coupler input fibers, the second group of the unterminated first ends being spliced to free ends of at least some of the first and second coupler output fibers, the optical circuit also separating the unterminated second ends of the optical fibers into another plurality of groups including a third group, a fourth group, and a fifth group;
   one or more input plug connectors terminating the third group of the unterminated second ends to optically couple the one or more input plug connectors to at least some of the input coupler fibers;
   one or more output plug connectors terminating the fourth group of the unterminated second ends to optically couple the one or more output plug connectors to at least some of the output coupler fibers; and
   one or more monitor plug connectors terminating the fifth group of the unterminated second ends to optically couple the one or more monitor plug connectors to others of the output coupler fibers.

2. An optical cable assembly comprising:
   a plurality of optical couplers, each optical coupler having at least one coupler input fiber, a first coupler output fiber, and a second coupler output fiber;
   an optical circuit having been manufactured on a flexible substrate, the optical circuit including a plurality of optical fibers, each optical fiber extending from an unterminated first end to an unterminated second end and being free to flex along a length of the optical fiber, the optical circuit separating the unterminated first ends of the optical fibers into a plurality of ribbonized groups including a first group and a second group, the first group of the unterminated first ends being spliced to free ends of at least some of the coupler input fibers, the second group of the unterminated first ends being spliced to free ends of at least some of the first and second coupler output fibers, the optical circuit also separating the unterminated second ends of the optical fibers into another plurality of ribbonized groups including a third group, a fourth group, and a fifth group;
   one or more input plug connectors terminating the third group of the unterminated second ends to optically couple the one or more input plug connectors to at least some of the input coupler fibers after removing the flexible substrate;
   one or more output plug connectors terminating the fourth group of the unterminated second ends to optically couple the one or more output plug connectors to at least some of the output coupler fibers after removing the flexible substrate; and
   one or more monitor plug connectors terminating the fifth group of the unterminated second ends to optically couple the one or more monitor plug connectors to others of the output coupler fibers after removing the flexible substrate.

3. The optical cable assembly as claimed in claim 1, wherein the one or more input plug connectors include one multi-fiber plug connector that receives all of the second ends of the third group.

4. The optical cable assembly as claimed in claim 1, wherein the one or more input plug connectors include a plurality of single-fiber plug connectors that each receive a respective one of the second ends of the third group.

5. The optical cable assembly as claimed in claim 1, wherein the one or more input plug connectors include a plurality of duplex-fiber plug connectors that each receive a respective pair of the second ends of the third group.

6. The optical cable assembly as claimed in claim 1, wherein the one or more output plug connectors include one multi-fiber plug connector that receives all of the second ends of the fourth group.

7. The optical cable assembly as claimed in claim 1, wherein the one or more monitor plug connectors include one multi-fiber plug connector that receives all of the second ends of the fifth group.

8. The optical cable assembly as claimed in claim 1, wherein each optical coupler includes only a single coupler input fiber.

9. The optical cable assembly as claimed in claim 1, wherein each optical coupler includes a pair of coupler input fibers.

10. The optical cable assembly as claimed in claim 1, wherein the input plug connectors are optically coupled to all of the input coupler fibers.

11. A method of assembling an optical cable assembly including a plurality of optical couplers, each optical coupler having at least one coupler input fiber, a first coupler output fiber, and a second coupler output fiber, the method comprising:
    laying a plurality of optical fibers into an adhesive layer on a substrate to form an optical circuit, each optical fiber extending from an unterminated first end to an unterminated second end, the optical circuit separating the unterminated first ends of the optical fibers into a plurality of groups including a first group and a second group, the optical circuit also separating the unterminated second ends of the optical fibers into another plurality of groups including a third group, a fourth group, and a fifth group;

splicing the first group of the unterminated first ends to free ends of at least some of the coupler input fibers;

splicing the second group of the unterminated first ends to free ends of at least some of the first and second coupler output fibers;

terminating the third group of the unterminated second ends to one or more input plug connectors to optically couple the one or more input plug connectors to at least some of the input coupler fibers;

terminating the fourth group of the unterminated second ends to one or more output plug connectors to optically couple the one or more output plug connectors to at least some of the output coupler fibers; and terminating the fifth group of the unterminated second ends to one or more monitor plug connectors to optically couple the one or more monitor plug connectors to others of the output coupler fibers;

removing the substrate from the optical circuit.

12. The method as claimed in claim 11, wherein each optical coupler includes a pair of coupler input fibers.

13. The method as claimed in claim 11, wherein the another plurality of groups also includes a sixth group; and wherein the method further comprises
  terminating the sixth group of the unterminated second ends to one or more second monitor plug connectors to optically couple the one or more second monitor plug connectors to others of the input coupler fibers.

14. The method as claimed in claim 11, further comprising:
  ribbonizing the free ends of the coupler input fibers prior to splicing the free ends of the coupler input fibers to the first group of the unterminated first ends; and
  ribbonizing the free ends of the first and second coupler output fibers prior to splicing the second group of the unterminated first ends to free ends of the first and second coupler output fibers.

15. The method as claimed in claim 11, wherein the optical circuit separates the unterminated first ends of the optical fibers into the plurality of groups also including a seventh group and an eighth group; and wherein the method further comprises:
  splicing the seventh group of the unterminated first ends to free ends of others of the coupler input fibers;
  splicing the eighth group of the unterminated first ends to free ends of others of the first and second coupler output fibers.

* * * * *